United States Patent [19]
Strömberg

[11] Patent Number: 5,602,993
[45] Date of Patent: Feb. 11, 1997

[54] METHOD AND SYSTEM FOR REVISING DATA IN A DISTRIBUTED DATA COMMUNICATION SYSTEM

[75] Inventor: Fredrik Strömberg, Bromma, Sweden

[73] Assignee: ICL Systems AB, Kista, Sweden

[21] Appl. No.: 167,844

[22] PCT Filed: Jun. 12, 1992

[86] PCT No.: PCT/SE92/00411

§ 371 Date: Feb. 7, 1994

§ 102(e) Date: Feb. 7, 1994

[87] PCT Pub. No.: WO92/22870

PCT Pub. Date: Dec. 23, 1992

[30] Foreign Application Priority Data

Jun. 12, 1991 [SE] Sweden ................. 9101795.4
Jun. 12, 1991 [SE] Sweden ................. 9101796.2
Feb. 28, 1992 [SE] Sweden ................. 9200604.8

[51] Int. Cl.$^6$ ................. G06F 15/16; G06F 15/177; G06F 9/445
[52] U.S. Cl. ................. 395/200.1; 364/280.3; 364/962.1
[58] Field of Search ................. 364/200, 222.8, 364/276.3, 281.9, 280.3, 962.1; 395/200, 200.03, 200.04, 200.1, 650, 700, 183.14

[56] References Cited

U.S. PATENT DOCUMENTS

| | | | |
|---|---|---|---|
| 4,532,588 | 7/1985 | Foster | 365/650 |
| 4,718,002 | 1/1988 | Carr | 364/200 |
| 4,928,224 | 5/1990 | Zulian | |
| 4,974,149 | 1/1990 | Valenti | 364/200 |
| 5,008,814 | 4/1991 | Mathur | 395/200.1 |
| 5,057,935 | 10/1991 | Williams | |
| 5,426,421 | 6/1995 | Gray | |
| 5,495,610 | 2/1996 | Shing et al. | |

FOREIGN PATENT DOCUMENTS

320607 6/1989 European Pat. Off. .
461058 12/1991 European Pat. Off. .

*Primary Examiner*—Alyssa H. Bowler
*Assistant Examiner*—Mark H. Rinehart
*Attorney, Agent, or Firm*—Lee, Mann, Smith, McWilliam, Sweeney & Ohlson

[57] ABSTRACT

The invention relates to an arrangement and to a method for revising selected data in a distributed data communication system, eg such data as a data program or document intended for a number of a plurality of destination devices (AEI, AEII, LSE2, LSE3) in the data communication system individually selected by an administrator, in which each destination device includes at least one memory unit (ME, LSM2, LSM3) for individual storage of data. The revision involves, for instance, installing and/or changing the selected data, a) a list of the selected destination devices is established; b) a procedure for the revision of the data on the selected destination devices is established and the procedures (L2; C2) are stored as a revision recipe; c) there is created a data package which at least contains the data to be revised and its revision recipe; d) the data package is distributed internally in the data communication system to the selected destination devices; e) the selected destination devices interpret the information in the data package with the aid of a special interpretation program installed in each destination device and initiating procedures on the basis thereof.

15 Claims, 6 Drawing Sheets

CONFIGURATION OF AN INSTALLED APPLICATION

FIG. 7

METHOD AND SYSTEM FOR REVISING DATA IN A DISTRIBUTED DATA COMMUNICATION SYSTEM

The present invention relates to a method of the kind defined in the preamble of claim 1, and an arrangement for carrying out the method. The invention particularly relates to a method and an arrangement for revising selected data in a distributed data communication system, e.g. a data program or document for a plurality of destination devices in the data communication system, where each destination device includes at least one memory unit for individual storage of data, wherein said revision involves, for instance installing and/or removing and/or changing the selected data. Examples of such distribution devices are user units, e.g. PCs, terminals which coact with a network service unit, although other networks may be included when revision is to be effected from one network to another.

BACKGROUND ART

Reference to installation made in the following is also intended to include reconfiguration, updating and de-installation of program products and other types of information, such as documents.

When installing software in data communication systems, the same installation process has traditionally been repeated manually and individually for each unit in the data communication system that is intended to include the software. This means that the information required for the installation, which is normally obtained by questions asked of the user, must be repeated time and time again, which is highly time-consuming and liable to cause errors. Furthermore, this procedure often results in non-identical execution of the installations—an inhomogeneous system is obtained, which may later lead to problems, for instance when re-configuring, updating or de-installing software. This applies particularly to the installation of software in data communication systems which include a large number of similar units in which it is desired to install program software in a unitary fashion.

The trend followed by the development of such systems is one in which at least a part of the processing capacity of a central computer unit has been transferred to a number of local computer units. For example, in present-day techniques, a central computer unit coupled to a number of terminals can be replaced with one or more local networks which include a plurality of personal computers and/or working stations. Previously, an administrator needed only to worry about the setting-up of software in the central computer unit. Since many units in the system are able to store and execute software individually and, in addition, also often have access to logic units in a service unit belonging to that particular local network, the administrator is nowadays presented with the technical problem of remembering which software was installed in which unit, which units need updating, etc. These problems become many times more difficult when so-called remote communication networks are used, where a large number of units are used and these units are spread over a wide geographical area, and may also be of many different kinds.

Neither is it possible to place a fully competent person at each local level, much less a competent person who has effective control over the system as a whole, so as to enable changes to be made, new versions of old programs to be installed, etc.

Another troublesome, technical problem is that of maintaining user units updated throughout the whole of the distributed computer system, both locally and globally, with the same version of data installed in a similar fashion in the various user units and for the various users. This has many times resulted in not-easily traced, "unexplainable" errors.

For example, it is relatively usual for program producers to introduce changes into commercial software and these changes to accompany the installation program without having been mentioned. When newly-purchased program software of this nature is installed with its installation program in an individual user unit, it is extremely difficult to determine or to trace which changes have been inserted. This can result in "unexplainable" errors occurring in the system.

Thus, the technical problem which is in need of solution is one of enabling data, such as software or some other type of information, for instance certain list files, i.e. documents, to be installed readily and in a unitary fashion in user units that are coupled to a data or communication system.

Another technical problem is one of enabling a data system administrator to keep a record of what is found installed in the system and where.

A network-connected data communication system is described in U.S. Pat. No. 4,974,149. A data descriptor file describes the software to be distributed to the remote systems from a central system. The information in this descriptor file is then employed by the remote systems to retrieve the software from an inventory library specified in the data description file. Thus, the remote systems get a description of software intended to be delivered to them and where to find this software. Two kinds of techniques to distribute data are described, one of them is to distribute data to components systems across a network, the other to distribute data by means of media, such as punched tape or cards, magnetic tape, or magnetic disks. The describing file indicates also if the software shall be automatically installed in a run library or if it should be installed by media for later manual installation.

OBJECTS OF THE PRESENT INVENTION

The prime object of the present invention is to provide a method and an arrangement for administrating a computer system, and then particularly to enable mass revision to be carried out automatically, for instance installing and/or removing and/or changing documents and/or software for all or selected user units connected to the computer system, where the user units can be of different types and the users can be of different kinds.

Another object of the invention is to enable programs or documents to be registered and/or de-registered in a simple fashion, so that it is easy to establish what is found installed in the computer system and where.

A further object of the invention is to enable the automatic, mass revision to be carried out quickly, simply and readily handled by the administrator or administrators responsible.

Still another object of the invention is to obtain a high capacity function with regard to delivery of commands to the destination devices.

Still a further object of the invention is to provide a computer system administration method and then particularly to a method which enables data, such as software, previously installed in user units connected to the computer system to be configured, version updated or de-installed.

The primary object of the invention is achieved with a method of the kind set forth in the characterizing clause of claim 1. Further features and further developments of the invented method are set forth in the remaining method claims.

Thus, the invention relates to the distribution of data for revising both within local networks and between local networks via remote communication networks, such as hierarchical computer network, from one central network to a local network which is administrated from the central network, or democratically from any local network whatsoever to any other local network whatsoever. By the term "remote communication network" is also meant a direct data network, for instance a telephone network, satellite connections and possible other types of communication networks and communication links, respectively.

The inventive system, or arrangement, enables different management orders to be distributed from a central site in a distributed data communication system to one or more local sites connected to the central site. The management orders may be of any kind whatsoever, a listing being given below under the definitions. The management order is of an abstract nature. Each actual management order is a specialized version of the abstract (c.f. objected orientated analysis and programming).

The various computer systems in each local site or network may be of any kind whatsoever within the area, from one single computer (e.g. a personal computer or a minicomputer) up to a complete local computer network (Local Area Network), including working stations, service units or service computers, minicomputers, large computers equipped with central memory function, etc. Each of these local networks will have at least one communication link with the network in the computer centre or centres, wherein the management orders are distributed over this communication link.

The management orders are received in the local networks, together with what shall be revised with special interpretive software and the orders received are carried out. When an order has been carried out successfully or has not been carried successfully, information concerning the result is sent back to the network that sent the order.

Those networks at the central sites have special software which is able to combine management orders. The networks at the central sites also form local networks which are treated in the same way as the other local networks. Thus, in a fully democratic system, each local network may be a network in a central site immediately it is to distribute data for revision in at least one other of the remaining local networks through the intermediary of a remote communication network.

The advantages afforded by the use of management orders (e.g. register and insert software in archives, install programs in working stations, make "backups" in databases, etc.) in accordance with a further development of the invention is that these management orders can be distributed effectively, reliably and quickly to a plurality of local networks with one single distribution order.

In order to solve the problem of obtaining high capacity order dispatch, a plurality of totally independent orders can be given simultaneously (in the same container), in accordance with the invention. These orders are carried out in parallel on all addressed destination devices, without the order dispatching central site needing to be equipped with separate technical arrangements for keeping a check on outstanding calls (c.f. RPC=Remote Procedure Call), which load the intermediate remote network or the order dispatching central. Furthermore, a container can be provided with a time stamp which may indicate when the container shall be distributed, said container preferably being sent at night, when the load and/or the tariff is lower. A container can also be compressed prior to being dispatched, so as to reduce the amount of information transmitted and may be decompressed upon receipt.

According to a further development of the invention, in preparation for the unison revision process:
a) data to be revised is first stored in its original form;
b) an administrator at an administration device, thereafter formulates a procedure for revising the data and stores this procedure as a data revising recipe;
and subsequent to the unison revising process:
c) information concerning the revising of said data is stored in a data archive.

This enables administrators to keep a check on software objects and their internal relationships in a data communication system of this size, as mentioned above. Software objects which can be handled by this method can be divided into the following groups:

Group 1 (Registered Packages): Delivery package—the original Program Document Preset/prepared program and/or document Etc.

Group 2 (Recipe): E.g. installation and de-installation procedures

Group 3 (Applications): Programs and documents ready to be taken into use

Group 4 (Application Editors): Configuration procedures

The concept of this further development of the invention is to enable an operator to know what has been installed (Group 3), what was the original (Group 1) and how that which is recorded in Group 1 has been transformed to that which is recorded in Group 3 (Group 2). That which is recorded in Group 4 describes how a package recorded in Group 3 has been reconfigured. All of this knowledge is held in at least one database which is always accessible to the administrators and which is preferably object orientated.

It is always highly beneficial to know the background of an application, to know how the application was made to fit the data communication system, to enable an application to be repeated, and also to know how and when an application has been reconfigured. This means that a delivery package with software which is to be installed in the system must always be found stored in at least one of the databases with all of its externally delivered installation software.

DEFINITIONS

Given below is a list of terms used in this specification and their meaning:

Recipe

Structured text which describes how a given software or a given document shall be created, installed and/or configured on a computer type in the system and the information required in order to carry this into effect.

A revision or revising recipe can be compiled by creating an especially adapted recipe on the basis of a general recipe, through question reduction. The method can be repeated to create a hierarchy of especially adapted revision recipes, i.e. a particularly adapted recipe can be used to create another especially adapted recipe, until all questions have been eliminated. This is an important possibility, particularly when the data communication system administered by the administrator is large, i.e. includes many units, and when the data communication system can be divided into groups of units which are unitary in some respect, for instance with respect to the type of screen used. For further information, see the copending Swedish Application No. 9103512-1.

Management Order

An type of order according to the invention which informs what is to be done with a revision package transmitted from one network to another. This is not a function, but a logic designation of an abstract high-level-service. Examples of different kinds of order are:

register or de-register program or document in archive;

register or de-register activation procedures;

activate program or document;

cancel activation order;

fetch packages, files, documents, etc.;

program and file distribution;

installation of software in a plurality of systems and/or computer units;

de-installation of software in a plurality of systems and/or computer units;

exchange of software, e.g. in version upgrading procedures;

reconfiguration of groups and/or local units;

security copying of databases;

events and error administration.

Group

One or more computer units or users which belong to a local or central administration unit and which have standardized properties for a given type of revision required at that time.

Data Package

A combination of at least data which is to be revised, and a revision recipe therefor, i.e. a revision package. If revision is to be effected from a local network, e.g. from one central to another local network, the data package is a container.

Container

A transmission package which comprises at least one revision package and at least one management order for each revision package for transfer from one local network to another.

Destination Device

The device to which a data package is to be sent for data revising purposes. A destination device may be a user unit in a local network, but may also be a network to which a data package is to be transferred from another network.

User Unit

A unit by which a user is able to obtain service, such as a terminal in coaction with a number of logic units in the server unit of a local network, personal computer or working station of some kind.

LAN

Local Area Network.

WAN

Remote communication network.

Administrator

A person who administrates a data communication system from a user unit adapted for administration purposes. The data system may comprise a plurality of systems, which may be mutually connected via LAN and/or WAN or some other type of communication network or communication links. An administrator may either be a local administrator and will then administrate solely one local network (LAN), or a central administrator who then administrates the entire data communication system through the remote communication network (WAN).

A local administrator is subordinated hierarchically to a central administrator. Several central administrators may be found in the data communication system.

Information Base

A data stored database which contains forms of information and/or an operative system.

Interpreter

A program capable of converting data structures to another data structure.

Mass Revision

Revision of the same software on a large number of units in a data communication system.

Gateway

A device which connects communicate-wise to networks which use different communication protocol, i.e. a "protocol converter".

Information Device

A database and/or an AI-application and/or a user.

Revision

By revision is meant installation of new programs, updating of existing programs, editing, the insertion of information, amendments to existing data and like revision procedures.

BRIEF DESCRIPTION OF THE DRAWINGS

So that the invention will be more readily understood and features thereof made apparent, the invention will now be described with the aid of illustrative examples and with reference to the accompanying drawings, in which.

Figures 1, 2:
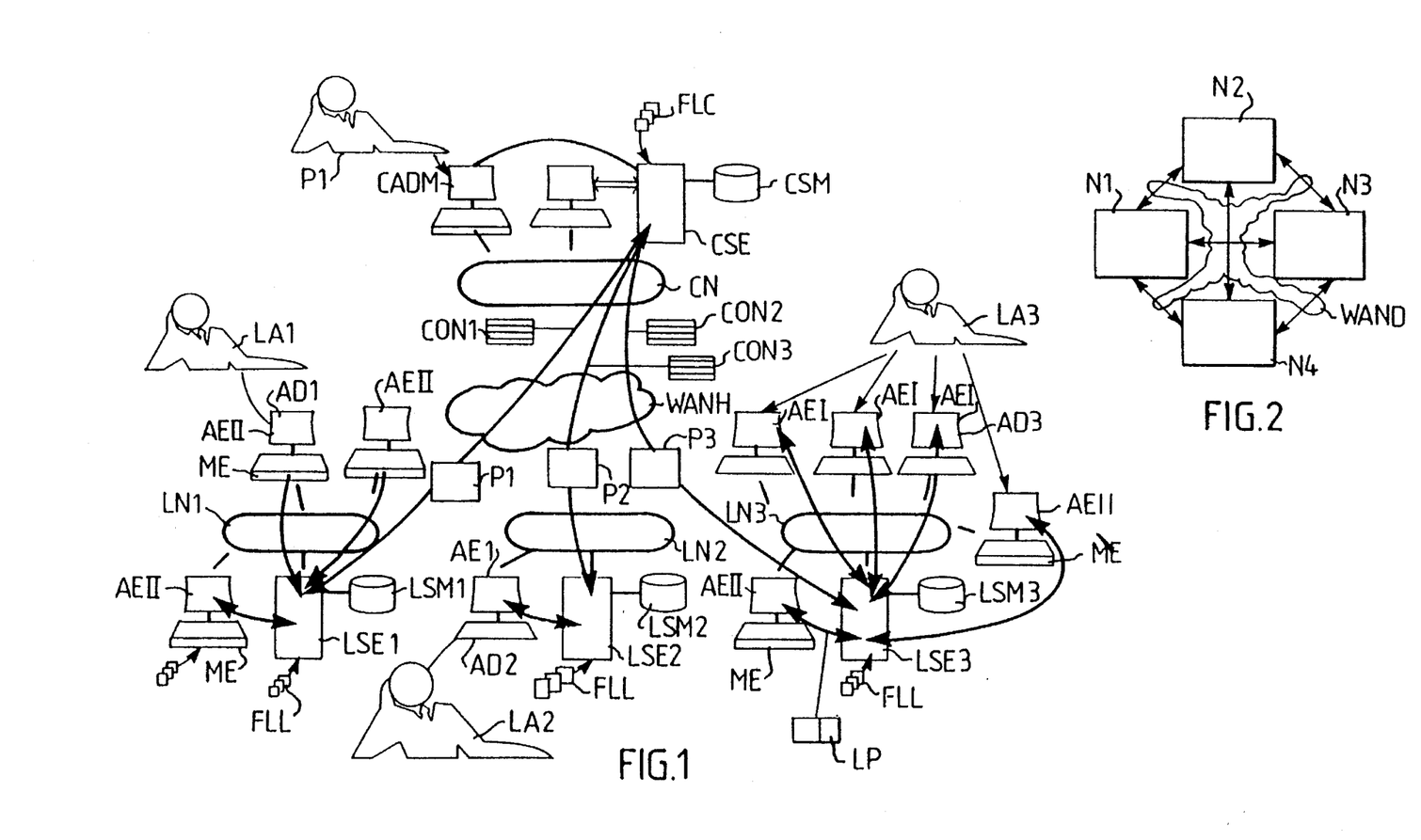
FIG. 1 illustrates one example of a hierarchically constructed data communication system, in which at least one central administrator administers the system.
FIG. 2 illustrates an example of a democratically distributed data communication system with which the inventive method and inventive arrangement can also be applied.

A MORE DETAILED DESCRIPTON OF FIG. 1

FIG. 1 illustrates an example of a distributed data communication system in which program products are administered by at least one administrator positioned at an administrator unit CADM, AD1, AD2, AD3, of which one CADM may be a central administrator unit coupled to a network CN in a central. More than one central administrator unit may be found in the central, these administrator units being placed in a given order of priority, such that one unit will have priority if several units should request access to the same function during the ongoing work. The administrator or administrators which must wait to request this function are informed of the fact on their terminal screens. Access can be allotted, for instance, by placing the administrators in an order of priority according to the order in which they couple themselves to the network CN in the central for distribution of data.

Each administrator unit has access to a memory space intended for the administration carried out by the administrator. The data communication system illustrated in FIG. 1 by way of example is constructed hierarchically, although the invention is not limited to precisely this type of system, as will be evident from the following description.

For the central administrator P1 in the network CN of the central shown in FIG. 1, this memory space lies in a central service memory CSM coupled to a central server computer CSE which coacts with the central administrator unit CADM at which the central administrator P1 is seated. The central server computer CSE may be a personal computer PC or a large computer, and the memory CSM is a primary or a secondary large computer memory or disc memory, respectively.

Data to be revised from the central, e.g. a program to be installed in the system by the central administrator P1, is first fed in its entirety to the central server computer CSE, as illustrated with the diskettes FLC. Naturally, diskettes can be inserted into any diskette station whatsoever in units that are coupled to the network CN of the central, although in the illustrated case, they are shown inserted directly into the server computer. It would be more natural for the administrator P1 to insert the diskettes in his/her terminal CADM, which in the FIG. 1 illustration is a computer having its own processing capacity and its own memory connected to the server computer CSE.

Each administrator unit may be comprised of or the same type as a user unit. A user unit is converted to an administrator unit by means of special software which is adapted for administration and to which the administrator has access.

The system illustrated in FIG. 1 includes three local networks (LAN) LN1, LN2 and LN3. The central server data CSE is coupled to a local server data LSE1, LSE2 and LSE3, respectively, in each of said local network, through the intermediary of a remote communication network WANH. A plurality of user units AEI or AEII are connected to the networks LN2, LN2 and WANH. A user unit may, e.g., be a terminal, personal computer or working station. The FIG. 1 embodiment has a pure terminal which may have its own limited processing capacity and which coacts with logic units in the network server unit, designated AEI, and a computer with its own memory and its own processing capacity, for instance a personal computer designated AEII.

The local networks LN1 and LN2 are connected with the remote communication network WANH through the intermediary of respective gates P1, P2 and P3. Each local network has a local administrator LA1, LA2 and LA3 respectively. These administrators administrate revising of data in their own particular local network through the intermediary of a unit which functions as a respective administrator unit AD1, AD2 and AD3 for administration purposes.

The inventive data communication system has a special logic structure.

The network administration application may be found in the central administrator unit CADM of the FIG. 1 illustration and constitutes the uppermost node in a hierarchy. This unit administers the entire system hierarchically.

This uppermost node is also found in a more democratically constructed system (see FIG. 2, which will be described further on) immediately an administrator in a local network allows data to be revised by a user in at least one other local network. This administrator will then function, at his/her administration unit, as a central administrator for precisely that particular revising procedure and then functions hierarchically in the system.

The domain administration application is an intermediate node which administers the local part which can be made by the local administrators LA1, LA2 and LA3. The domain administration application transmits and receives information from the network administration application and serves said application.

Object Management Agent is a lower level of intermediate node and administers a separate user unit AEI or AEII. It serves the domain administration application. When data revising is to be carried out in at least one user unit in a local network, information is sent to the effect that a revision package is to be fetched from the local server computer. The user unit then fetches the revision package at the earliest suitable opportunity. Alternatively, the package can be sent together with the aforesaid information. The alternative chosen will depend on the local network and on the units included in said network, the choice made being the one which is most practical in the prevailing context.

The aforedescribed structure also includes the addressing structure. An example of protocol suitable for use between the different levels in the hierarchy is standardized OSI-protocol (CMIP). This permits the coexistence of several parallel protocols in the structure between the various levels, e.g. SNMP, CMOT, CMOL.

According to one preferred embodiment, the distributed data communication system operates in the following:

1. Incoming data to be revised in distribution devices in the data communication system is registered and stored in its entirety. When concerning software, the installation program and configuration program, etc., are also stored in addition to the actual software itself, together with name and version. This is preferably effected both at local and central levels.

2. The data revising program is adapted to the local network or networks in which it is to be revised. This means that part of the questions, or all of the questions asked, e.g. in an installation procedure can be answered beforehand and the answers saved separately in the form of a recipe. This is done with the cooperation of the administrator. A particular program language is preferably defined and made accessible to all users of the system.

3. When data is to be revised from the central, the central administrator creates a transfer package, hereinafter also referred to as a container, which is an enclosed form containing the data and possibly also its recipe, depending on the type of order given, and at least one management order, which may be of different kinds and which, e.g., register the data on the archive of the receiving node. A distribution list to the container discloses to which local network or local networks the data is to be sent. Management orders in the container can then denote the user units in the local networks in which the data is to be revised. Other, different types of management orders are given in the list of definitions at the beginning of the present description. The management order preferably also indicates the data to be registered in an archive in the receiving local network. The archive can be stored in a memory which is also used for other purposes, or stored in a separate memory unit.

Several data, together with revision recipe and management order therefor, can be placed sequentially in one and the same container. In this type of hierarchical data communication system, illustrated in FIG. 1, the central administrator creates a container CON1, CON2, CON3, for each local network LN1, LN2, LN3, which includes a user which shall have revised data. It should be noted that containers having mutually the same content can be sent to a selected number of local networks at one and the same time. The local office is grouped and these groups can be used to simplify creation of distribution lists. In the hierarchical data communication system illustrated in FIG. 1, the containers are then sent separately, although preferably at the same time, to each local network, which functions as a means for distributing the container.

4. Unpacking of the container sent from the central administrator is preferably effected automatically in the local network, in the order in which the transmitted data is packed in the container by the central administrator. In this case, the container is stored in its entirety, first in the local service memory LSMi, where i=1 to 3. Firstly, an automatic or manual check is made to ensure that the data in the container is correct, whereafter orders are carried out and verified and a report is sent back to the central. When necessary, the local administrator creates a special data revising recipe for the users concerned in the local network and creates a data revising package and recipe for distribution to the individual, selected distribution devices, such as the user units in the local network for revising of said data. The revision package within the local network includes an management order associated to the order is found a list of the users who are concerned with the revision of data.

5. A message is then sent to each of the users, user groups, computers or computer groups which are to have revised data.

A local archive, e.g. LSM2, in the local network LM2, contains all of the programs and documents (files) which have been archived by the local administrator unit AD2, or which are distributed with the aid of an order in a container sent from the central. Removal from the archive must be effected explicitly, i.e. only when it is no longer found installed in any one of the user units connected to the network. It is not possible to remove data centrally when the data has been distributed to a local network unless a message has been received from the central to the effect that the data is no longer anywhere installed.

6. Subsequent to carrying out the order in a container in the local network, a status report is sent back to the central administration unit for registration in the central archive. Archiving can also be effected directly in the archive.

According to the invention, a program archive is thus preferably stored in an archive memory area in each network, centrally and locally. The program archive will preferably include an object orientated database, in which program products and information associated therewith are stored.

7. It is also possible for the local administrator to revise data totally separately in his/her local network, as illustrated with the floppy disks FLL in the local networks LN1, LN2, LN3. The central need not be informed to this effect, and is archived there. When necessary, the central administrator can connect to any local network whatsoever and obtain information relating to everything that has been registered in the archive of the local network.

8. It is also possible, as an alternative, to send a separate container for registering and archiving in the archive, and a separate container for installation of the selected, individual user units AEI or AEII connected to the local network. If desired, at least some local networks may permit revision directly after unpacking information from a container sent by a central administrator, without assistance from a local administrator, but solely with the assistance of an administration program. A management order enclosed with an installation package may state whether the package shall be distributed to a user in the local network concerned either automatically or with the aid of an administrator.

In order to illustrate thoroughly the different cases relating to data revision, the network LN1 illustrates a network in which data revision is solely carried out on personal computers AEII, and then directly in the memories of said computers; the network LN2 illustrates a network to which only terminals are coupled, these terminals being served by the local server computer and the registers of which in a local memory LSM2 are coupled to the local server computer; the network LN3 illustrates a network with both terminals AEI and computers AEII of significant processing capacity and their own memory.

A container CON1 sent to the local network LN1 is received by the local server computer LSE1, where the container is unpacked and orders carried out. In the local network LN1, data is always revised directly in the units AEII. It will be understood that one or more of the user unit AEII may be occupied or closed-down at precisely that moment when it is intended to transfer data. Accordingly, the system is such that the server computer signals the concerned user units in the network, using an appropriate code, that revision shall be carried out. The different user units then fetch data from the server computer with an installation recipe at a convenient point in time, if the revision cannot be carried out immediately.

A container CON2 sent to the local network LN2 is also in this case received by the local server computer LSE2, where the container is unpacked. Since the user units AEI in this network are solely terminals, data is revised in the logic units in the local server computer LSE2 in the memory areas in LSM2 to which the various users at the units AEI have access. Thus, in accordance with the invention, the administrator formulates a revision recipe including the data to be revised. The revision package of data and recipe is then sent to the logic units in the server computer and revision is carried out with the aid of the recipe and the particular software used in accordance with the invention.

A container CON3 sent to the local network LN3 comprising a mixture of user units AEI and AEII, which is often the case in practice, is also received in this instance by the local server computer LSE3, where the container is unpacked. Data with recipe is created and revision carried out partly in connected computers AEII and partly in the memory areas of the local service memory LSM3, to which the various user units AEI and also the majority of the user units AEII have access. The administrator LA3 is shown in the network LN3 and is able to select the administrator unit AD3 in which he/she shall work, freely among a plurality of user units AEI and AEII. Thus, the administrator function accompanies the administrator LA3 and not the special unit AEI, AEII, at which he/she works.

Of course, this also applies to the networks LN1 and LN2. However, it may be necessary in network LN1 to install certain software in the user units so that these units are able to serve as administrator units.

It should be noted that a user unit may be a large computer, such as a network computer, or a personal computer or working station connected to a network.

The local administrator unit AD1 with memory ME in network LN1 may, for instance, be a powerful working station which has a stationary disk memory, although other types of computer and memory devices are conceivable.

Different types of computers may be coupled to the local networks. For instance, LN1 may solely have Macintosh units. LN3 may solely have IBM units, for instance. A specially prepared recipe can be produced for each of the networks concerned. For example, if the Macintosh units have several different types of keyboard, these units may, in turn, be divided into groups (according to keyboard type TYP I and TYP II), and a recipe can be created for each one of these groups from the recipe created for the network containing solely Macintosh units.

It should be noted that the composition of the data communication system is not significant to the present invention and may thus have a construction different to that illustrated in FIG. 1. It can be mentioned by way of example that the same type of computers can be found in different local networks and that these computers may be included in the same groups. Furthermore, a group may be constructed from solely those computers which are found in one of the local networks. Thus, the same user unit may be included in more than one group. The groups may also overlap one another, either partially or completely.

FIG. 2 illustrates an embodiment of a data communication system which is distributed totally democratically and which is not hierarchically constructed and has no central administration. The data communication system includes solely a plurality of local networks N1–N4, each of which is able to transmit data for revision to all of the other networks. In this case, this transfer of data is also effected through the intermediary of a remote communication network WAND. It will be noted that containers which contain management orders are created for all transmissions for revision between the different networks. Solely revision packages for revision are created within each network. Other, different types of data communication systems, e.g. different mixtures of hierarchic and democratic systems, than those illustrated are also conceivable within the purview of the invention.

ITEMS IN A PROGRAM REGISTER

Figure 3:
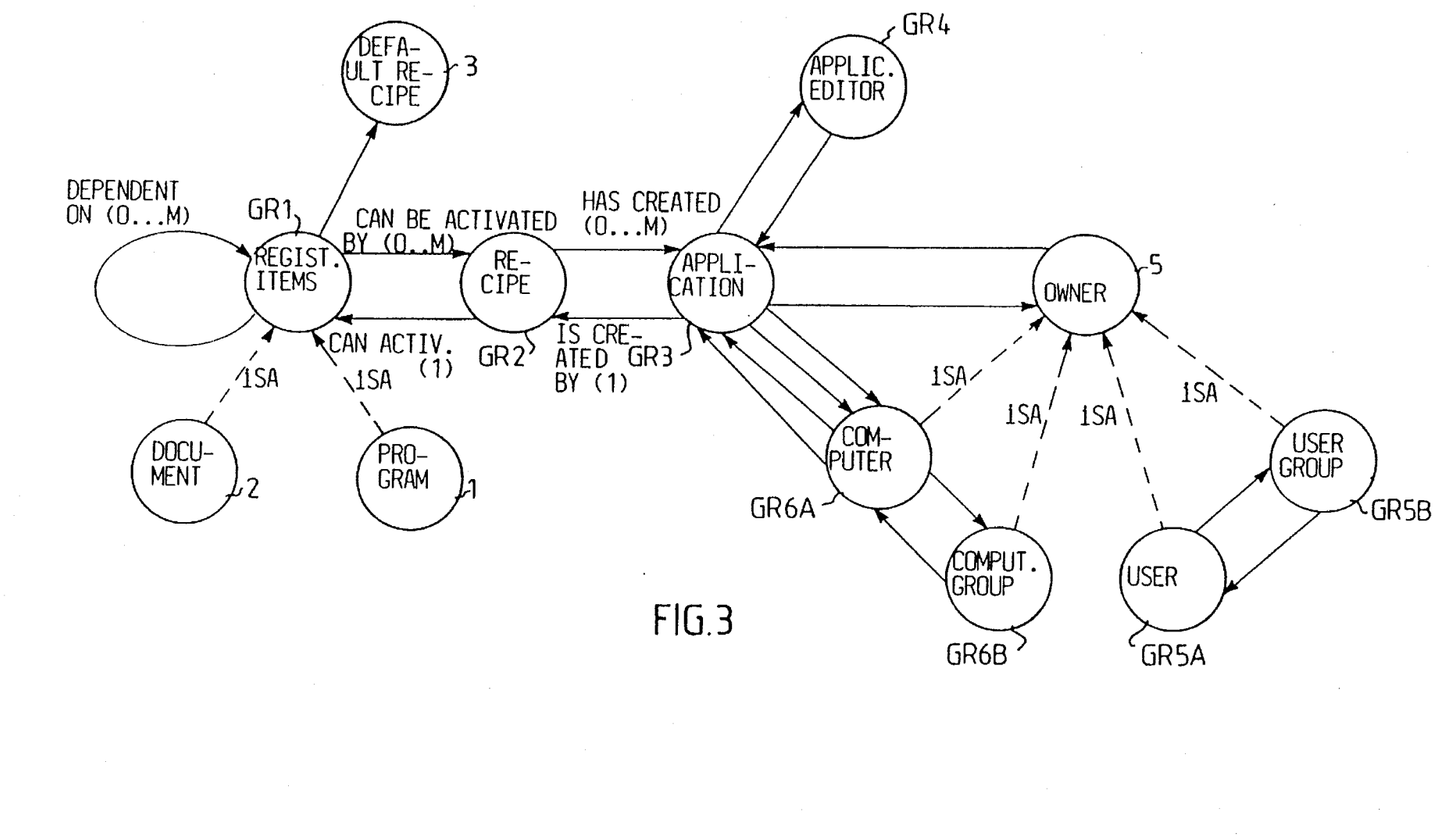
FIG. 3 is a diagrammatical illustration of a so-called conceptual plan, which may constitute a model for a preferably object orientated database.

Information-carrying objects, here referred to as items, include information concerning the item in question, wherein the information is stored in an object field. The items about which an administrator may require information in order to be able to administer a data communication system, such as an inventive data communication system of the kind illustrated in FIG. 1, will now be described with reference to FIG. 3. FIG. 3 is a diagrammatic illustration of a so-called conceptual plan which may form a model of a preferably object orientated database, which may include a program register and which may form a part of an information system. The various item groups, described below, and their mutual relationships are noted in the plan.

Explanation of different relationships in the conceptual plan:

Inherited relationship (ISA); for instance, a program 1 is a registered item;

0 . . . M relationship; zero, one or more relationships are found between those items the relationship is drawn between; for instance, there may be from 0 to M different recipes connected to each registered item;

1 relationship; for instance, each recipe may belong to one, and only one registered item.

The main items are stored in the program register in the memory AM of the administrator computer and are handled by the administrator and can be divided into four general groups:

Group 1: Registered Items (GR1)

The delivery package received by the administrator. Information concerning a delivery package stored in a program register (such as L1 in FIG. 4, C1 in FIG. 5, as described in more detail below) may include:

Program—the original (1 with inherited relationship ISA to GR1).

Document (2 with inherited relationship ISA to GR1)

Pre-installed/prepared program and/or document (3, where GR1 acknowledges to 0 . . . M relationships, M being an arbitrary number).

Relationships with other delivery packages (4).

Group 2: Recipe (GR2)

These recipes describe how a given software shall be installed in or erased from a computer, i.e. how an installable application (GR3) is obtained from a delivered program original (GR1) or how installed software (GR3) is erased (de-installed). There are from 0 . . . M relationships from GR1 to GR2, i.e. each program/document may have several recipes. There is one relationship from GR2 to GR1, i.e. each recipe belongs to only one program/document. The installation recipe and de-installation recipe are stored in a procedure register (such as L2 in FIG. 4, C2 in FIG. 5, as described in more detail below).

Group 3: Applications (GR3)

Programs and documents that are completed are taken into use. Information concerning an application stored in a distribution register (such as LARK in FIG. 4, CARK in FIG. 5, as described in more detail below) includes:

The registered program product from which it has been created.

How it was created, i.e. which recipe was used (GR2).

How it was configured, i.e. which application reviseor was used (GR4).

Where it is stored (owner 5, GR5A, GR5B, GR6A, GR6B).

Each application is unique, i.e. only one relationship from GR3 to GR2 is found. Several applications may be found, i.e. there may be 0 . . . M relationships from GR2 to GR3.

Group 4: Application Editor (GR4)

An application editor changes data in an application (GR3) through the medium of a configuration recipe stored in the procedural register and/or the distribution register. Each application register is unique, i.e. only one relationship is found from GR4 to GR3. Several application editors may be found for each application, i.e. there may be 0 . . . M relationships from GR3 to GR4.

Those items found in GR3 disclose which applications are installed. The original items are found in GR1 (the original). The manner in which GR3 items were installed, i.e. installed applications, is disclosed by the installation recipe in GR2. The manner in which GR3 items are de-installed, i.e. installed applications, is disclosed by the de-installation recipe in GR2. The configuration recipe in GR4 describes how installed applications have been reconfigured.

Information may also be required concerning further items, for example which users, user groups, stations and station groups are found in the system which the administrator has to administer. These items are divided into GR5A, GR5B and GR6A, GR6B, which are in inherited relationship with, i.e. are subordinate groups to the group owner 5.

Group 5A and 5B: Users (GR5A and User Groups (GR5B) Respectively

Information concerning users and user groups may include names, organizations, locations, system rights, etc. Users and user groups can be registered, changed and removed (erased), and information concerning users and user groups can be derived from the program register and be listed.

Groups 6A and 6B: Stations (GR6A) and Station Groups (GR6A)

Information concerning stations and station groups may include names, physical locations, types and make of product, which applications are found stored on the station and which applications have been created therefor.

All groups GR5A, GR5B, GR6A, GR6B can have the same type of relationships as those shown between GR3 and GR6A, although not shown for the sake of clarity. These relationships mean that GR6A has 0 . . . M applications GR3 and is capable of operating 0 . . . M applications, and that 1 . . . M applications in GR3 is/are stored in each station in GR6A, which is able to operate 0 . . . M applications. It will be understood that the arbitrary number M recited in the aforegoing limits can vary among the different relationships between the groups.

ITEMS OPERATIONS

When a new post is to be registered, a new stage is created in GR1, registered items. Stored in this stage is all necessary information around the actual post itself and its relationship to other registered items, together with the information (data, program, document, etc.) which includes the software object. Expressed in another way, the items in GR1 encapsulate the original software object. It is possible to register one or more prepared recipes (GR2), together with the registered item.

The registered data object is always unique with regard to name and version. A data object whose name and version already exists cannot be registered.

When a data object has been registered, the administrator creates a new recipe or uses one of the prepared recipes. The recipe describes the method of enabling a registered data object to be used in a data communication system (install data objects). According to the invention, the recipe encapsulates the installation procedures/program relevant to the registered data object. The recipe contains sufficient information to enable the creation of an application to be repeated with the same result as that achieved on an earlier occasion. The recipe always contains information concerning the data object for which it is adapted to operate. It is possible to have several recipes defined for a rule with registered data object, i.e. a registered data object (GR1) may have one or more recipes, and one recipe will always belong to a registered data object. Also found are recipes which contain information as to how the created application shall be deinstalled.

An application is defined as a software object which can be used (start/operate, read/write). Normally, it is necessary to adapt a program delivered from a software retailer to the surroundings in which it shall be used. The recipe describes this adaptation and the item Applications (GR3) contains information concerning the usable software objects. A special recipe can be used to make several applications, which will behave in mutually the same way. The item applications (GR3) contains information concerning the recipe to be used when the application is created. The recipe also contains information concerning the original software object (the data object registered in GR1). This is therefore possible for the administrator to trace back in order to discover how the application was created and which original was used.

The application item also contains information concerning where the application is stored (secondary memory), in which computer (computers) it can be operated, and the user for which it is intended ("owner" 5 of the application).

When using a configuration procedure/software encapsulated by the item Application Editors (GR4), it is possible to reconfigure an application. The method of reconfiguring can be saved in the item. An initial configuration can be made when creating the application.

In order for the administrator to be able to administer the data communication system, it is necessary that certain operations can be carried out on the information stored in the program register.

General operations that can be carried out on all item groups include the possibility of the administrator:

1a) registering an item, e.g. registering a new application;

1b) changing an item, e.g. changing a recipe already stored;

1c) de-registering an item, e.g. erasing a user from the program register; and 1d) deriving and listing information, e.g. listing items which fulfil a search condition, such as listing all applications or listing all applications that have been created with a given recipe, etc.

These general operations are standard and are to be found in a plurality of information systems, and hence they will not be described in depth here. On the other hand, in order to be able to administer the program register and therewith the data communication system, it is natural that the administrator will require access to at least a part of these standard operations.

Specific operations that can be carried on one or more item groups, or on a combination of several item groups, include possibilities for the administrator to:

2a) Create/install a program product.

2b) Reconfigure an installed program product.

2c) De-install an installed program product.

2d) Replace an installed program product with a new program product, for instance an updated version of an old program product.

These specific operations form the core of the intentions of the inventive method and consequently will be described in more depth below, with reference to FIGS. 4–7.

DESCRIPTION OF AN EXEMPLIFYING EMBODIMENT OF THE INVENTION

Figure 4:
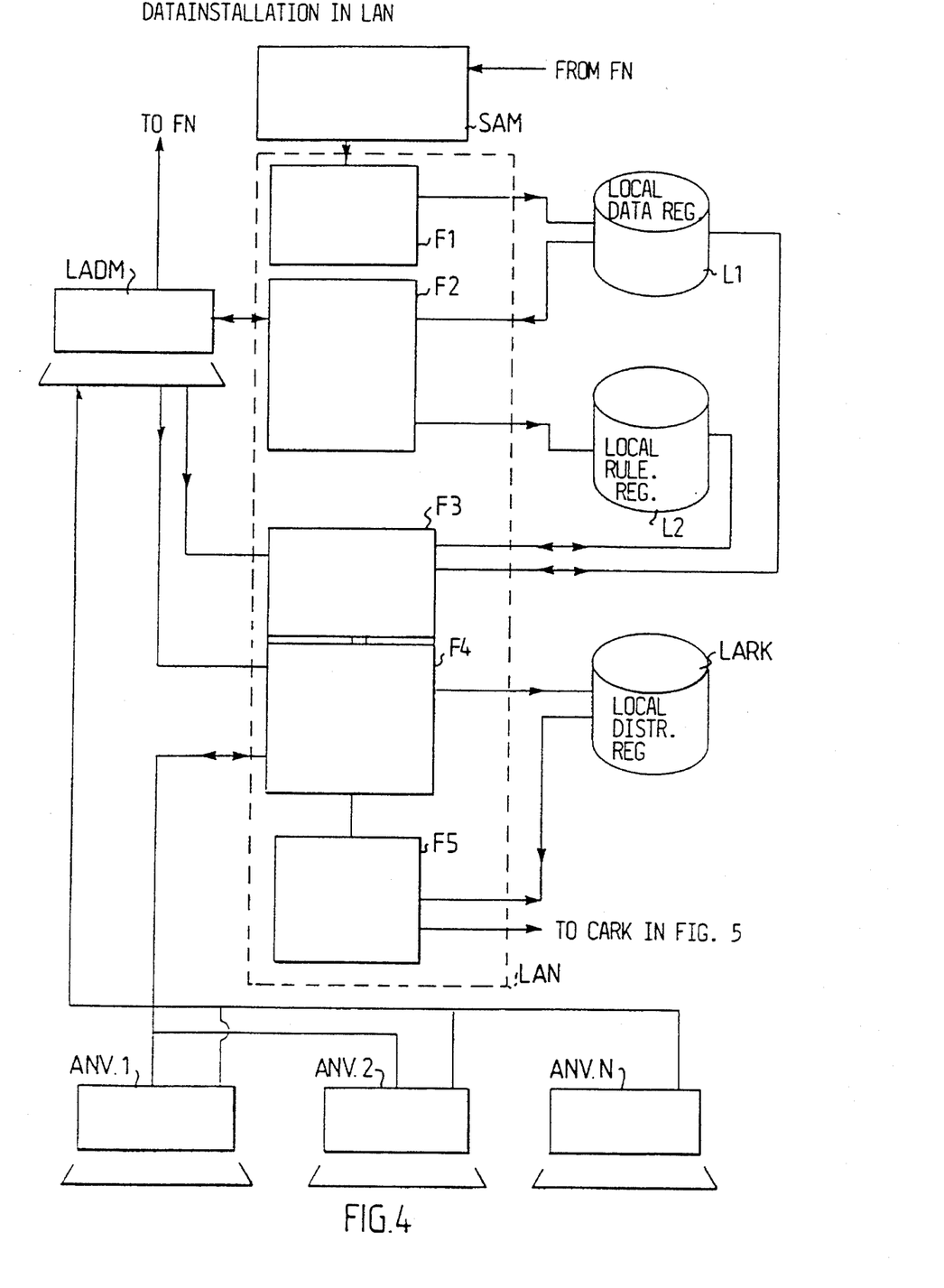
FIG. 4 illustrates schematically one embodiment of data installation in a local network.

FIG. 4 illustrates an inventive embodiment of a data installation in a local network LAN. It will be noted that the working methods given in the network LAN in FIG. 4 are those which are carried out in accordance with the invention, and that the network LAN also includes normal network functions. The arrangement enables a revision packet containing revisions, i.e. data with revision recipe, to be distributed from a local administration unit LADM to one or more groups of local distribution devices, such as user units ANV1, ANV2, . . . ANVN, which are connected to the administration unit LADM in the local network LAN.

A group in a local network may comprise a single user unit or several user units ANV1, ANV2. A user unit may, for instance, be a terminal, a personal computer or working station, or any one of these at which a user works.

A container CON arriving from the remote communication network WAN and containing data SW to be revised in one or more of the user units ANV1, ANV2, . . . ANVN, is registered and stored in a first stage F1, immediately into a local data register L1. The local administrator may also insert into the local register a delivery package with software from some data deliverer, this software later being processed in the same way as though it had arrived in a container from the central network CN (see FIG. 1).

Information concerning a revision package stored in the data register L1 is the same as that given in the item in GR1 (Registered Items) above.

It should be noted that when new software is sent in a container from one local network to another, preferably the whole of the delivery package is sent from the program manufacturer with the enclosed installation program, so that the entire delivery package will then be found registered in the local data register L1. Furthermore, a special installation recipe adapted for the data communication system concerned and for the special user unit in the system can be enclosed.

A particular example will be used throughout the following for the purpose of clarifying the specific operations that can be performed with the aid of the information contained in the program register. This example relates to a delivery package which includes a program product ErgoWord 4.0, the prepared, general recipe ErgoWord.Install, ErgoWord.Config and ErgoWord.UnInstall and data stored documentation ErgoWord.Doc. In the case of this example, all parts included in the product are delivered by the data deliverer as files on a diskette.

A container from the central network includes all of this information in the form of a software data package, an installation recipe and administrative data which discloses what shall be done with the data package in the local network.

In a second stage F2, an administrator at the administration unit LADM can, if necessary, install the data from the local data register L1 on his/her machine, configure the data, which may be software or a document or some other type of information, so that this information can be used by the units in the local network. This means that the administration unit LADM may create standard procedures to this end, i.e. revision recipe, for instance software installation recipe, are created which are particularly adapted to the user units in the data communication system on which the revision of the program product shall be effected. A revision recipe may also include restrictions of software to be installed, so that only those parts of a software which are adequate to a given type of user are installed by this user, so as not to unnecessarily occupy an excessive amount of memory space. For example, this may mean that solely those parts of a software suitable for secretaries are installed when the users concerned are secretaries.

The recipe describes how an operable application can be obtained from a delivered program original, or how an installed program shall be de-installed. Thus, the installation program of a software can be adapted to each local office in which the program shall be installed, and separately for each type of user unit found in the office. All questions that precede an installation can be answered beforehand and the answers saved. A system intended for this purpose is described in our copending Swedish Patent Application No. 9103512-1. Preferably, there is defined a language in which all types of installation programs can be described. This language is then available to the user units. The procedures are stored in a local procedure register L2.

When the program product is accompanied with a prepared, general revision recipe, this recipe is copied from the register L1 and especially adapted. The original, general recipe will always remain in the data register L1. An application editor is able to change data in an application via a configuring recipe. This can then be stored in the procedure register L2.

It should be noted that when software is distributed from the central network, the central administrator can provide the software with a simple installation recipe. The local administrator can then provide the software with a more specified recipe, if required.

In this example, a copy of ErgoWord.Install is adapted to the group of user units AEI or AEII that are connected to the network LN3, and is stored in the data register L1 under the name ErgoWord.InstallLN3.

When data is to be revised in one or more user units ANV1, ANV2, a GR is created in a third stage F3 from these user units, unless already created. The data and the procedures herefor are fetched from the registers L1 and L2, and a revision package is created on information relating to the user units on which the data shall be revised.

Data concerning revision that has been carried out is updated in a fifth stage F5, first in a local distribution register LARK. This register will contain:

Information concerning data distributed in user units connected to the local network and where it is found.

Data, such as software and other information which has been taken into use.

Information concerning the local network LAN, with regard to name and administrative identity of data stored in user units in the local network.

Information concerning an application which can be derived from the distribution register will then include, among other things:

a) What it was created from (GR1 in FIG. 3).

b) How it was created (GR2).

c) If it has been changed and, if so, how (GR4).

d) Who has the right to use it (GR5).

e) Where it is stored (GR6).

Figure 5:
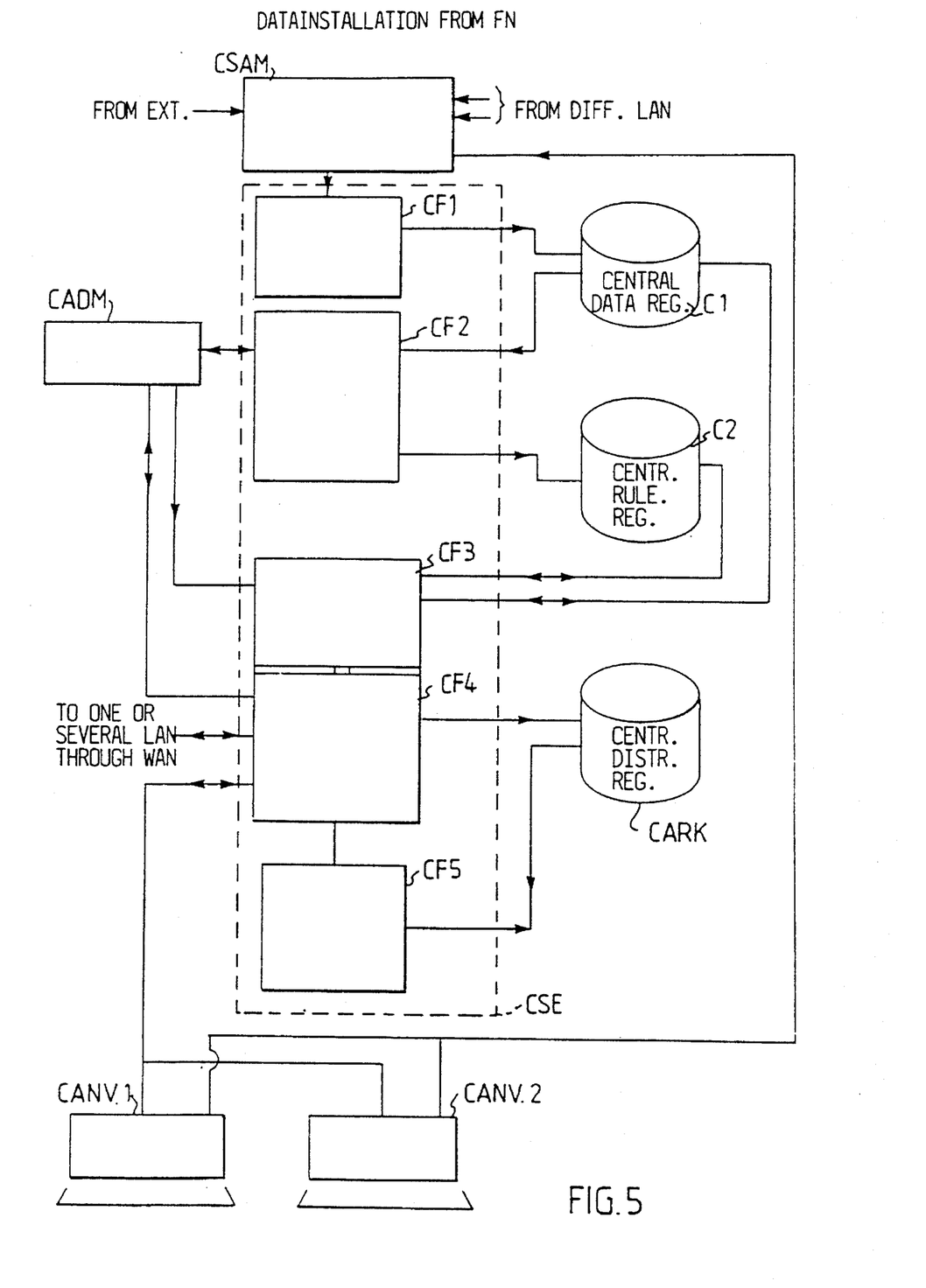
FIG. 5 is a schematic illustration of one embodiment of data installation from a local network, for example an administrative central, to at least one other local network through the intermediary of a remote communication network.

FIG. 5 illustrates the administration of data revision in a central network CSE, which communicates with the local networks through the medium of a remote communication network WAN. The method by means of which this achieved is comparatively similar to the method carried out at a local level and shown in FIG. 4. In precisely the same manner as with the local network, a collection of data, preferably in the form of a delivery package from a data distributor is registered and stored in a first stage CF1 in a central program register C1.

It will be understood that the system may be constructed so that containers arriving from one of the local networks LN1 or LN2 connected to the remote communication network WAN may also be transferred to the central. These containers will optionally have been pre-checked by one of the administrators AD1, AD2. Thus, it also lies within the purview of the inventive concept to construct the system so that the central register C1, C2 and CARK can register information concerning stored data in the entire data system, if so desired. However, it is more practical and more simple to manage, particularly in the case of large data communication systems, when solely those programs and documents that have been distributed from the central are registered in the central register, so that, when necessary, the central network is able to take information from the local registers as to what is stored therein.

In a second stage CF2, SW is installed in a central administration computer CADM for processing by the central administrator.

The central administrator determines groups of users and/or computers for the arrived data in stage CF3.

The group created in stage CF3 involves the generation of groups in the local networks while disclosing groups of user units/users within these networks. Thus, the central administrator creates a transfer package, a so-called container. This container will include at least one management order, together with the data and its revision recipe. This implies that the product shall be registered in the local data register of the receiving local network. For example, by stating "all", it is conceivable that all users having access to the user units AEI or AEII on which the installation shall be made shall also have access to the software. A certain type of management order may be to the effect that the transmitted software and its recipe shall be installed directly in a local network without needing to involve the local administrator. In this case, it may be suitable to send the software and its installation recipe in two separate packages, one containing an management order with regard to registration in the register L1 and the second containing an management order concerning automatic installation. Both of the management orders are preferably sent in one and the same container.

In the administration unit CADM, there is a synthesis program which combines management orders.

It should be noted that since data in the central register C1, C2 and CARK is intended to be sent further to one or more of the local networks for further processing by the administrators of these networks, the data and the standard procedures carried out for installation of the data can be made completely standard.

The management order concerning a program product in the transfer package sent to a local network may imply that the program product shall be registered in the local program register. A part-order of this management order may include that a program product, e.g. ErgoWord 4.0, is installed in the designated user units in the local network directly, i.e. without involving the local administrator, in accordance with an installation recipe, e.g. ErgoWord.InstallLn2.

The method in which data is installed in stage CF4 differs from the method used in each local network, in that a container is created which is sent to network LAN, given as the receiver. The container can be considered as a data package which has at least one local network as its distribution device. The transmitted containers are then unpacked in the local networks and the revision packages included in the container are distributed to the various user units, which then function as distribution devices for this type of data package.

The installation work is performed in stage CF4 in accordance with the first part of the flow sheet of FIG. 6, which will be described in more detail below.

The transfer package (the container) is provided with a distribution list (Local Network LN2) and thus includes, in the given example:

software (ErgoWord 4.0);

a specially-adapted installation recipe (ErgoWord.InstallLN2);

a user list ("all");

optionally a time stamp (1991-12-24 15:00), which states the desired time of installation (described in more detail below) or the desired time of transmission and may have the following format:

"Install ErgoWord 4.0/Recipe: ErgoWord.InstallLN2/Users: All/Time: 1991-12-24 15:00"

"Distribute LN2" is included in all containers as their distribution list.

The revision package is then sent to the designated users, as illustrated in FIG. 5.

Information concerning user units and groups of user units may include names, organizations, locations, system rights, etc. User units and respective groups of user units can be registered, changed and removed from the distribution register LARK, CARK, and information relating to these units and groups of units can be derived from the register and listed.

Information concerning stations and station groups may include names, physical locations, types and makes of manufacture, which applications are found stored in the station and which applications have been created therefor.

It has been said in the aforegoing that the data, the procedure or procedures for installation of the data and its distribution are stored in three separate registers L1, L2 and LARK and C1, C2 and CARK respectively. It will be obvious that these registers can form parts of one and the same register and/or memory areas of a memory unit which can also be used for purposes other than for registering data which is installed. The different registers may, of course, be conventionally stored distributed in the memory unit. The different registers may be included in a distributed database.

Neither is it necessary to have these registers updated at local levels, even though this is to be preferred and is necessary in large data communication systems. Instead, all information concerning each local installation after an installation is transferred to central register C1, C2, CARK (which may also comprise parts of the same register) illustrated in FIG. 5, for archiving. In this case, the registers L1, L2 and LARK are instantaneous registers which are created in a memory, e.g. the network memory FSM of a network computer ADM2, prior to each installation, and then erased or written-over with other information.

Figure 6:
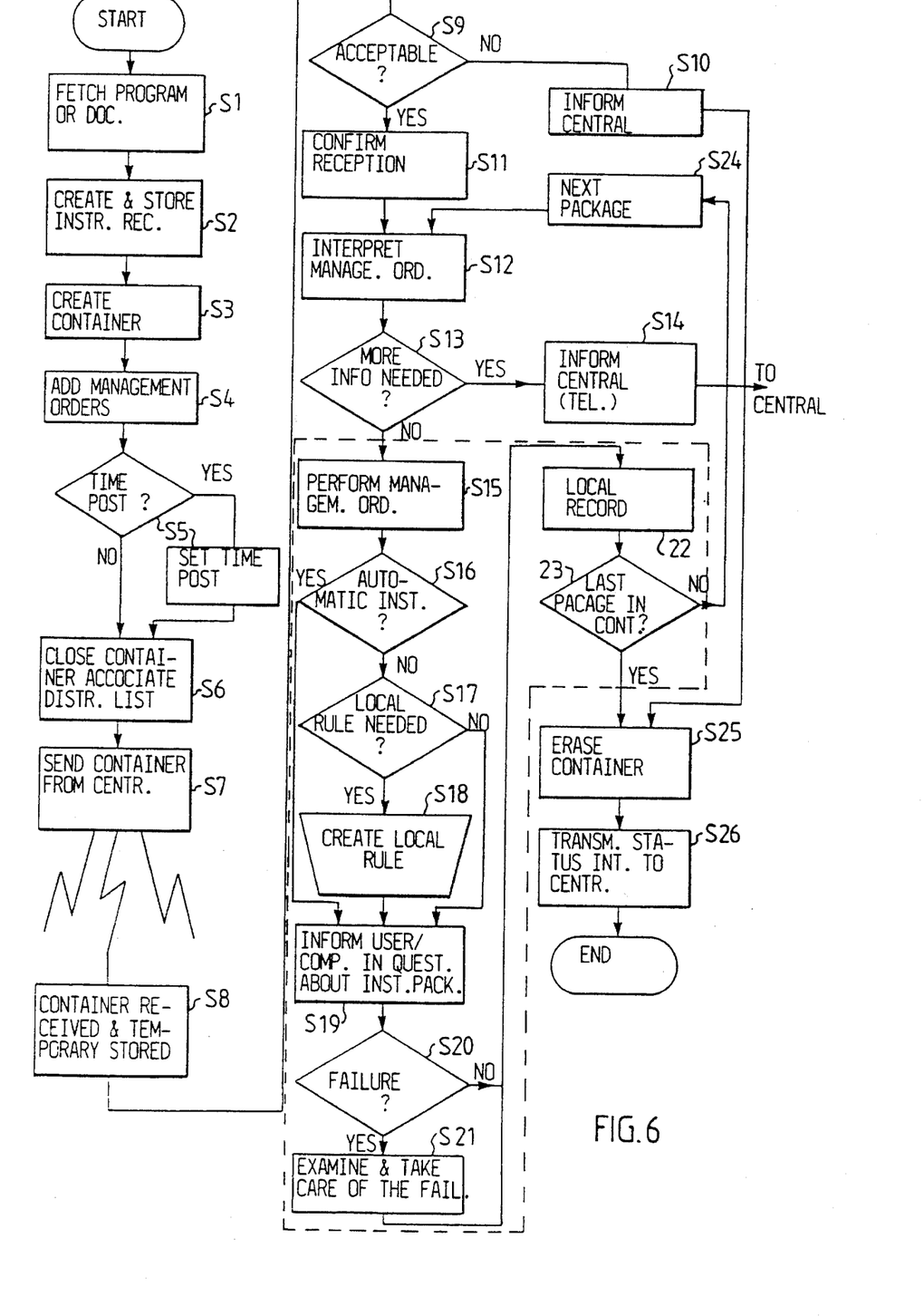
FIG. 6 is a flow chart illustrating a method for distributing the distribution package in accordance with the present invention.

FIG. 6 illustrates an example of a flow chart of a method for distributing the installation package from a central to user units ANV1, ANV2 connected in the local network LAN.

S1. The first method stage, or step, comprising fetching programs or documents to be installed.

S2. An installation recipe is created, if required. A so-called installation package is created from the program or the document, with its installation recipe. An installation package has a standardized format for compilation.

S3. A container is created for distribution to the local network or networks to which the installation package shall be sent. As mentioned above, several revision packages, e.g. installation package, de-installation package, etc., can be placed in one and the same container.

S4. One or more management orders are enclosed with the installation package.

S5. It is possible to permit the package to be distributed to the user units selected on the distribution list at a given time point. This time point is evident from a time disclosure that can be associated with the installation package in the form of a special management order. Thus, the central administrator can choose to set a so-called time stamp. (A time stamp can be set individually on each package in a container, either separately or on the container as a whole).

Alternatively, the time stamp can state the times at which the management orders shall be carried out. It is also conceivable to apply two or more time stamps of mutually different kinds. A time stamp for dispatching the container makes it possible to transmit the container during nighttime or during those times at which the load on the networks used is at a minimum. This can also lower transmission costs.

S6. The container is closed and a distribution list associated to the container.

S7. The container is sent from the central administration unit and transferred to selected local user units.

S8. The container is received at the local network, where it is stored in its entirety in a first stage. The packages are then unpacked from the container in the sequence in which they were placed into the container.

S9. The information received is checked.

S10. If the information is judged to be invalid, a message to this effect is sent to the central. Stage S25 is then carried out.

S11. Receipt of the container is confirmed to the central, by sending a receipt to the central administrator.

S12. The management orders are interpreted.

S13. A decision is made as to whether or not further information is required.

S14. If further information is required, a message to this effect is sent to the central, whereafter stage S25 is carried out, since the central creates a new, supplemented container and re-sends the container.

Alternatively (not shown), a dialogue may be carried out with the central. If there is a need of further information, a dialogue is established with the administration unit or with some other information base, and the management orders are then carried out in S15 in accordance with the information obtained. This stage may include the possibility of correcting management orders and/or interrupting the execution of these orders (not shown).

S15. If no further information is required, the management orders are carried out in the sequence chosen when placing the orders in the installation package concerned.

(The packages are also processed in the same sequence at which they were packed. If there is a time stamp for one or some of the packages, these can be stored intermittently while packages without a time stamp are processed. Several pack-ages may have a relationship with one another, in which case these packages will be provided with the same time stamp and will be processed in the sequence given by the times on the time stamp. However, the packages are always processed one at a time.)

S16. Does the management order imply that the installation package shall be distributed directly, without involving the local administrator? If the answer is Yes, go to block S19.

S17. Is it necessary to create a local installation recipe, or is the installation recipe sent by the central satisfactorily? If the answer is No, continue to block S19.

S18. If the answer to S17 is Yes, the local administrator can, in turn, create for each package an installation recipe which is particular for the receiving user units, resulting in one or more procedural steps.

S19. Using the local network, the local administrator informs the users concerned that an installation package is there to be fetched.

The user units fetch the installation package at the first convenient opportunity. Each user unit has an interpreter program. The interpreter program receives the installation package, interprets the package, i.e. ascertains the type of revision to be carried out according to the package, and initiates procedures on the basis of this interpretation.

The installation recipe may, for instance, be executed by an installation program in the user unit. This may be stored in the memory (AM, CSM, FSM) of the receiving station, in the illustrated case in the network memory FSM and/or directly in a user unit, when this is a separate computer, e.g. a personal computer (PC). When the revision recipe has been executed, there is obtained an application which has been particularly adapted to intended user units AEI or AEII.

S20. If a user is unable to perform an installation, an error message is given. If no such message is found, proceed to S22.

S21. The local administrator investigates the error and rectifies the same, if possible.

S22. Registration of an executed installation is effected in the local distribution register. It should be noted that this archiving may also be effected at another time point in the flow-chart diagram in FIG. 5, e.g. earlier.

When an management order is executed, the original program product (e.g. ErgoWord 4.0) is archived in the program register in the memory of the receiving user unit, i.e. in the network memory FSM in the illustrated embodiment. The installation recipe belonging to the program product (e.g. Ergo-Word.InstallLN2) is also archived in the same program register.

In the illustrated embodiment, it is assumed that the local administrator LA2 operates via the network computer AD2 (FIG. 1) and that the local program register is stored in the network memory LSM2, and consequently the receiving unit in this particular case is the network computer LSE2.

S23. Was the package processed the last package in the container?

S24. If the answer to S23 is No, take the next processing order and proceed to stage S12.

S25. Since the entire container has now been processed and has fulfilled its purposes, it can be eliminated. This is either effected by erasing the container or also by placing the container in a separate memory device in which the history of the user unit is registered.

S26. A status message is transmitted to central, as a finalizing stage.

OTHER REVISION OF DATA IN USER UNITS THAN INSTALLATION

When revision other than installation of new data, e.g. reconfiguration, de-installation or exchange of data, is to be carried out, the differences to the installation procedures are mainly as follows:

A specific revision recipe is created, instead of creating a specific installation recipe.

The post in the program register concerning the application to be revised is updated.

Only the specially-adapted revision recipe is registered.

The transfer package includes only the name of the application and its specially-adapted revision recipe.

Figure 7:
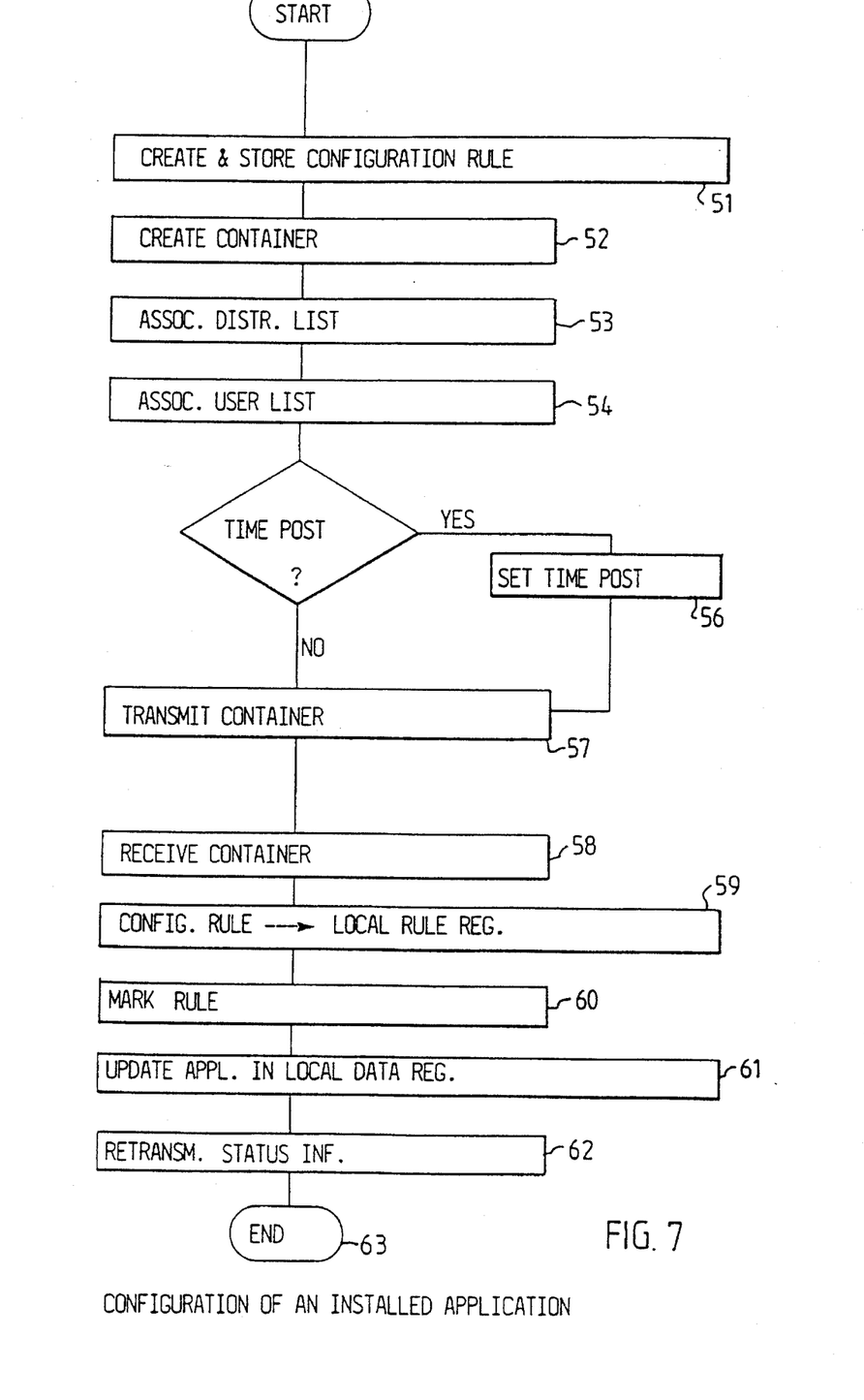
FIG. 7 is a flow chart illustrating a method for configuring software that has already been installed.

An example of this is illustrated in FIG. 7, which is a flow chart illustrating configuration data which has already been distributed to one or more user units AEI or AEII.

S51 Subsequent to starting up, there is created a configuring recipe which is adapted particularly to those user units AEI or AEII, which are to obtain a reconfigured application.

If the revision package of the program product included a prepared, general configuration recipe, this recipe is copied and especially adapted, whereafter it is stored as an application editor in the program register L1 or C1.

In the illustrated case, a copy of ErgoWord.Config is adapted especially for the group of user units AEI or AEII which are connected to the network LN2, and is stored in the program register under the name ErgoWord.ConfigLN2. If a prepared recipe does not accompany the revision package, the administrator himself/herself can create an especially adapted recipe.

S52 A transfer, or transmission, package is created, which in addition to stating the application concerned also includes an management order which implies that the especially-adapted configuration recipe shall be registered in an, optionally, local program register stored in a memory (SM, CSM, FSM). A part-order of this management order may include the instruction to configure the application, e.g. ErgoWord 4.0, in accordance with a configuration recipe, e.g. ErgoWord.ConfigLN2.

S53 A decision is made in this stage on which user units AEI or AEII, alternatively groups of user units (LN1, WAN, LN2), the application shall be configured, wherein a distribution list of receiving user units AEI or AEII or groups of user units (LN1, WAN, LN2) is given and associated with the transfer or transmission package.

In the illustrated embodiment, this list comprises only one single element, namely the group of user units in the local network LN2.

S54 Those users or user groups which shall have the right to use the configured application are given in this stage, wherein the user list is also associated to the transfer package. For example, by stating "all" it is conceivable that all users having access to the user units AEI or AEII on which the configuration shall take place will also have access to the software. For example, by stating "as before", it is conceivable that those users which were authorized prior to the configuration will also be authorized subsequent thereto.

S55 Shall a time stamp be set?

S56 A time stamp can be set via this decision stage.

S57 The transfer package is transferred.

In this particular case, the transfer package may thus include:

a name of an application, i.e. a name of an installed program product (ErgoWord 4.0);

an especially-adapted configuration recipe (ErgoWord-.ConfigLN2);

a user list ("as before");

a time stamp (1992-02-26 23:59); and may have the following appearance:

"Config ErgoWord 4.0/Recipe: ErgoWord.ConfigLN2/ Users:"as before"/Time: 1992-02-26 23:59". "Distribute LN2" is enclosed in the transfer package as its distribution list.

S58 The transfer package, or container, is received.

S59 The registration orders are carried out; in the illustrated example, the configuration recipe (ErgoWord.ConfigLN2) is archived in the program register of the memory of the receiving unit, in this case, the network memory FSM.

S60 The configuration order is carried out, wherein the configuration recipe may, for instance, be executed by a configuration program stored in the memory (SM, CSM, FSM) of the receiving station, in this case in the network memory FSM. The named application has been configured, when the configuration recipe has been executed.

S61 The application stored in the program register with information as to whether or not the application has been reconfigured with the configuration recipe is updated, in the network memory FSM in the present case.

It is assumed in the illustrated example that the application can be stored as a divided resource in the network memory FSM, wherein the user units AEI or AEII coupled to the local network LN2 need not keep a copy of the application in their own memories ME, but may have access to the application through the network LN2. If the configuration recipe is so especially adapted to the system to which the program product shall be configured in that no further information is required by a local administrator, the configuration can be effected automatically by the receiving user unit AEI or AEII.

Alternatively, the transfer package is received by a local administrator, which then configures the application with the aid of the configuration recipe in each user unit AEI or AEII in the system administered by said administrator, or if the application is a divided resource, in a user unit AEI or AEII to which the other user units have access.

S62 In this stage, a status message is sent, via the communication system (LN2, P2, WAN, P1, LN1) from the receiving user unit, in this case, the network computer AD2, to the administrator computer.

When configuration is successful, it can be registered in the central program register that an application has been successfully configured.

Other types of revision can be readily performed by one skilled in this art and will not therefore be described in detail here.

EXAMPLE OF MASS INSTALLATION OF DATA OTHER THAN SOFTWARE

For instance, the inventive data communication system can be used for booking flight tickets. An administrator computer is positioned in a central unit for all flight bookings within a particular airline and a plurality of users of the system are travel agents of several nationalities. When a large number of prepared question-and-answer alternatives are found stored in different language versions, the administrator at the administration unit may, for instance, elect to question the user of user unit AE3 about supplementary information concerning a given flight booking. The administrator chooses question 2 on his/her English language menu and the question 2 appears in the Swedish language on the user unit AE3. The user of AE3 chooses, e.g., answer alternative 5 on his/her Swedish answer menu and corresponding identification is sent back to the administrator unit. It is also possible to compile completely new answers, by combining a number of answer alternatives.

When transferring information between different user units, one or more so-called identifiers may be included. An identifier is used to indicate information in the memory of the user unit. Since the data communication system may include user units based in several different countries and/or users which use different human languages when using the user units, an identifier is highly beneficial when communicating between these units. Furthermore, this results in a considerable reduction in the amount of information that must be transferred, or transmitted, since only one or a pair of identifiers is/are sent between the units, instead of sending whole questions and answers. A system of this kind is described more explicitly in the copending Swedish Patent Application No. 9103513-9.

However, there may be reason to change the configuration of what is presented on the screen, from time to time. It may also be desired to add illustrating matter provided with an additional identity. Storage of this identity in the different booking terminals can be effected commonly, globally for all booking terminals, e.g. by the administrator of the administration unit, in accordance with the invention.

I claim:

1. In a distributed network-connected data communications system having a plurality of working stations for users of the data communication system, a method to achieve unison revision of selected data, such as a data program or document, in a number of destination devices selected from a plurality of destination devices (AEI, AEII, LSE2, LSE3) by an administrator through an administration device in the data communication system and intended for the users, where each destination device includes at least one memory unit (ME, LSM2, LSM3) for individual storage of data, said revision being data revision and comprising, for instance, installing and/or removing and/or changing the selected data, the following method steps being carried out by the method:

(a) a list of the selected destination devices is established; and (b) a data package is distributed internally in the data communication system to the selected destination devices;

characterised in that in order to be able to direct data packages individually to destination devices, which may be of different kinds and/or have different kinds of users, before distribution of the data package for the selected destination devices of each kind and/or each kind of user the following steps are carried out:

(c) an individual procedure for revision of the data on the selected destination devices is established by the administrator, and the procedure (L2:C2) stored as a special revision recipe comprising structured text indicating how the revision is to take place;

(d) at least the data to be revised and its revision recipe are combined to form the data package, and that after distribution of the data package, (e) the selected destination devices interpret the information in the data package with the aid of a special interpreter program installed in each destination device, and the procedures are initiated on the basis of this interpretation.

2. A method according to claim 1, characterized in that in preparation for said unison revision:

a) firstly, data which is to be revised is stored and kept stored in its original form (L1; Cl);

b) then, subsequent to said unison revision, information concerning said data revision is stored (LARK; CARK) in a data register in connection with the administration device (LADM).

3. A method according to claim 1 for use where destination devices are connected to local networks (LN1, LN2; LAN), which local networks are connected to a remote communication network (WAN), and where revision of data is to be effected from a first local network, eg a local network for a central site, to at least one other local network, characterised by forming in the first network a transmission package containing at least one said data package for installation in a destination device in a said other local network and at least one management order for each data package relating to what shall be done with that data package at the destination device;

by distributing the transmission package to the local network or networks in which data is to be revised, each network to which the transmission package is distributed being considered as a destination device for the transmission package;

by receiving the transmission package and storing said package at least temporarily in each other local network. concerned; and by unpacking the data packages with their management orders from the transmission package in the receiving local network and carrying out the orders in the same sequence as that in which they were placed in the transmission package.

4. A method according to claim 3, characterised in that a local administration device (AD1, AD2; LADM) handles, through a computer, the transmission package and compiles at least one local data revision package from the contents of the transmission package and distributes this revision package to any destination device connected to the relevant local network for which the data revision package is appropriate, said destination devices having the form of user units, server computers, etc.

5. A method according to claim 1, characterised in that distribution of the data package is effected by sending a message to each of the destination devices on the list to the effect that the data package can be fetched, wherein each destination device at the first convenient opportunity thereafter informs that it can receive the data package, whereafter the package is transferred.

6. A method according to claim 1, characterized in that when necessary a time stamp (S5) is associated with at least one of said data package(s), said time stamp implying that the data package with time stamp is transferred to and/or is distributed to the selected destination devices at a time evident from the time stamp.

7. A method according to claim 2, characterised in that the receiving destination devices confirm receipt of the data package by communication with the transmitting administration device.

8. A method according to claim 1, characterized in that each means which receives the data package first checks that the information contained in the data package is valid (S9).

9. An arrangement for revising in a network-connected distributed data communication system selected data, such as a computer program or document adapted for revision in a plurality of destination devices (AEI, AEII, LSE2, LSE3) in the data communication system, each destination device having at least one memory unit (ME, LSM2, LSM3) for individual storage of data, wherein said revision involves, for instance, installing and/or removing and/or changing the selected data, said arrangement including:

at least one device functioning as a destination device also functioning as an administration device (LADM, CADM), operable by an administrator, for revision of selected data on at least one of the destination devices carried out internally within the data communication system;

means in each administration device (LADM; CADM) for distributing said package to the destination device or devices; characterised by (a) means in each administration device (LADM; CADM) whereby the respective administrator selects the destination devices of the system in which data is to be revised and makes individually adapted special recipes comprising structured text indicating how the revision is to take place for each selected destination device;

(b) a synthesis program in each administration device (LADM; CADM) by means of which, when data not intended for direct installation is to be received, a compilation is effected of the data to be revised and the respective revision recipe to form a respective said data package; and (c) a special interpretation program is installed in each destination device for interpreting information in a said data package distributed thereto and initiating procedures on the basis thereof.

10. An arrangement according to claim 9, characterised in that for the data to be revised, the following arrangement is provided for the administration devices:

a first data register means (L1;C1) for initial storage of the data to be revised in its original form;

a second data register means (L2;C2) for storing the special revision recipe generated by the administrator at the administration device (LADM; ID) and a third data register means (LARK; CACK) for storing information concerning the revision of data subsequent to completion of said revision.

11. An arrangement according to claim 9, characterised in that the destination devices are divided into groups;

in that each destination device may be included in one or more groups; and in that each administration device, by means of said synthesis program interacting with the administrator, is adapted to make a selection among the destination devices, such as a selection from among the groups, and when necessary is adapted to administrator distribution of the data package to the selected groups in the data communication system.

12. An arrangement according to claim 10, characterized in that the first, the second and the third data register means comprise parts of a common register memory area in the distributed data communication system, this common register memory area being adapted to register continuously data that is revised in the destination devices, and in that each administration device (LADM; CADM), interacting with the administrator, is adapted to store in the common register memory area revision recipe information with each revision of said data.

13. An arrangement according to claim 12, characterized in that the administration devices have each been allotted a respective priority device; and in that a central administration device (CADM) is assigned the highest priority, i.e. is superior of all others.

14. An arrangement according to claim 11, characterised in that the destination devices are connected to local networks (LN1, LN2; LAN) and the local networks are connected to a remote communications network (WAN) for transmission from a first local network to at least one other local network;

in that a said administration device (CADM; ID) in the first local network is adapted to create a transmission package from information stored in the first and the second data register means associated with said administration device and at least one management order for further processing of the information in the local network;

in that the administration device in the first local network is adapted to distribute the transmission package to the other local network, which acts as an independent destination device for this transmission package;

in that the administration device (AD1, AD2; LADM) in the other local network is adapted to receive the transmission package and if necessary to compile, either automatically or manually, at least one local revision package data package from the contents of the transmission package and to distribute the same to any destination device connected to the local network in question for which the data revision package is appropriate, in accordance with the management orders contained in the transmission package.

15. An arrangement according to claim 14, characterised in that the data register means coacting with each local administration device are instantaneous memories which are adapted to be erased or written-over with new information prior to the creation of each new revision package subsequent to carrying out revision and resending information concerning the revision for storage in data register means that coact with a central administration device (CADM).

* * * * *